(12) United States Patent
Mizutani

(10) Patent No.: US 6,932,657 B2
(45) Date of Patent: Aug. 23, 2005

(54) CONNECTOR HAVING TERMINAL FITTING COVERED WITH OUTER COVERING

(75) Inventor: Yoshio Mizutani, Aichi (JP)

(73) Assignees: Autonetworks Technologies, Ltd., Mie (JP); Sumitomo Wiring Systems, Ltd., Mie (JP); Sumitomo Electric Systems, Ltd., Osaka (JP)

( * ) Notice: Subject to any disclaimer, the term of this patent is extended or adjusted under 35 U.S.C. 154(b) by 0 days.

(21) Appl. No.: 10/716,524

(22) Filed: Nov. 20, 2003

(65) Prior Publication Data

US 2004/0142597 A1  Jul. 22, 2004

(30) Foreign Application Priority Data

Nov. 22, 2002  (JP) ......................................  2002-339679

(51) Int. Cl.$^7$ .......................................... H01R 13/405
(52) U.S. Cl. ...................................................... 439/736
(58) Field of Search ................................. 439/736, 606; 264/272.11; 29/883

(56) References Cited

U.S. PATENT DOCUMENTS

| | | | | |
|---|---|---|---|---|
| 5,926,952 A | * | 7/1999 | Ito ................................ | 29/883 |
| 6,007,387 A | * | 12/1999 | Uchiyama ..................... | 439/736 |
| 6,068,523 A | * | 5/2000 | Takahashi ..................... | 439/736 |

FOREIGN PATENT DOCUMENTS

JP  A 05-69868  9/1993

\* cited by examiner

*Primary Examiner*—Tho D. Ta
(74) *Attorney, Agent, or Firm*—Oliff & Berridge, PLC

(57) ABSTRACT

A connector includes: a terminal fitting having a bent portion; and an outer covering configured to cover a part of the terminal fitting, the part including the bent portion. The outer covering includes: an outer covering body made of resin; and a reinforcement member disposed at a position where restricting a deformation of the terminal fitting caused by an injection pressure acting thereon in molding the outer covering body.

5 Claims, 6 Drawing Sheets

CONNECTOR HAVING TERMINAL FITTING COVERED WITH OUTER COVERING

BACKGROUND OF THE INVENTION

1. Field of the Invention

The present invention relates to a connector having a terminal fitting covered with an outer covering and to be connected to equipment such as an inverter equipment for an automobile.

2. Description of the Related Art

In connecting a connector of a power circuit elongating from an inverter equipment disposed in an engine compartment of an electric vehicle to a motor for a wheel, it is often that a sufficient wiring space cannot be ensured in the vicinity of the motor. Therefore, in such cases, an electric wire drawn out from the connector must be bent substantially perpendicularly so as to be laid along an outer face of the motor.

However, an electric wire to be used in a power circuit is hardly laid in a state where the wire is bent in a desired curvature, because, as compared with that to be used in a signal circuit, a conductor and an insulation cover have a larger diameter, and the flexural rigidity and the restoring force against flexural deformation are higher.

As a technique of laterally bending an electric wire elongating from a back face of a connector housing, known is that in which a wire cover is put on a back face of a connector housing, and a wire that is laterally bent inside the wire cover is sideward led out from the wire cover (see JP-UM-A-5-069868). However, this technique in which a wire cover is used is applicable to an electric wire which is to be used in a signal circuit or the like, and which has a relatively low flexural rigidity, and is therefore hardly applied to a power wire having a high flexural rigidity.

A structure may be employed in which an electric wire elongating from a connector housing is not bent to be laid, and a terminal fitting connected to the wire is bent so that the connector has a shape bent into an L-shape as a whole. FIG. 6 shows an example of the structure. In a connector 100, a terminal fitting 101 is surrounded by an outer covering 102 which is formed by resin molding. The terminal fitting 101 has: an open-barrel shaped wire cramping portion 103; and a horizontal terminal 104 which is directed perpendicularly to the wire cramping portion 103, and which is to be connected to a terminal of equipment (not shown). The wire cramping portion 103 and a basal end portion of the terminal 104 are surrounded by the L-shaped outer covering 102, and a tip end portion of the terminal 104 horizontally protrudes from the outer covering 102 so as to be connected to the terminal of the equipment disposed inside a case of the equipment. The wire cramping portion 103 elongates along the outer wall of the case, and an electric wire 105 cramped to the wire cramping portion 103 is downward laid along the outer wall of the case.

When the connector 100 having a shape bent into an L-shape as described above is to be molded, the terminal fitting 101 of an L-shape is set in a mold, and a molding resin material is injected into the mold to mold the outer covering 102. At this time, when the injection pressure from the upper side of FIG. 6 acts on the terminal 104, there is the possibility that a bent portion 106 is downward displaced by the injection pressure while being deformed as shown in FIG. 7. In the case where the terminal fitting 101 is deformed in this way, there arises the other possibility that a part (the portion corresponding to the bent portion 106) of the terminal fitting is exposed from the outer face (the lower face in FIG. 7) of the outer covering 102.

In a structure in which also the wire cramping portion 103 is to be set in the mold, particularly, the injection pressure acts on the end face of the wire 105 to displace the wire 105 and the wire cramping portion 103 in the axial direction (the downward direction in FIG. 7). This positional displacement causes the bent portion 106 to be further deformed.

In order to prevent the deformation of the terminal fitting 101 due to the injection pressure from occurring, a technique to set the injection pressure to a low level may be employed. However, when the injection pressure is lowered, the pressure applied in the injection may become uneven, and causes a result that the surface of the outer covering 102 is roughened, and that the mechanical strength of the outer covering 102 is reduced. Therefore, it is not preferable to set the injection pressure to a low level.

SUMMARY OF THE INVENTION

It is therefore an object of the invention to prevent an occurrence of a deformation of a terminal fitting due to an injection pressure.

In order to achieve the object, according to a first aspect of the invention, there is provided a connector including: a terminal fitting having a bent portion; and an outer covering configured to cover a part of the terminal fitting, the part including the bent portion, wherein the outer covering includes: an outer covering body made of resin; and a reinforcement member disposed at a position where restricting a deformation of the terminal fitting caused by an injection pressure acting thereon in molding the outer covering body.

According to a second aspect of the invention, there is provided a method for manufacturing a connecter having terminal fitting covered with an outer covering, the method including: setting a reinforcement member in a die; setting the terminal fitting having a bent portion and being attached to a wire in the die; and injecting a molten resin into the die from a gate, in a state where the reinforcement member and the terminal fitting are set, to thereby molding the outer covering.

BRIEF DESCRIPTION OF THE DRAWINGS

The objects and advantages of the present invention will become more apparent by describing a preferred embodiment thereof in detail with reference to the accompanying drawings, wherein.

DETAILED DESCRIPTION OF THE PREFERRED EMBODIMENTS

Referring now to the accompanying drawings, a description will be given in detail of a preferred embodiment of the invention.

Hereinafter, a connector 1 according to the embodiment of the invention will be described with reference to FIGS. 1 through 5.

Figure 1:
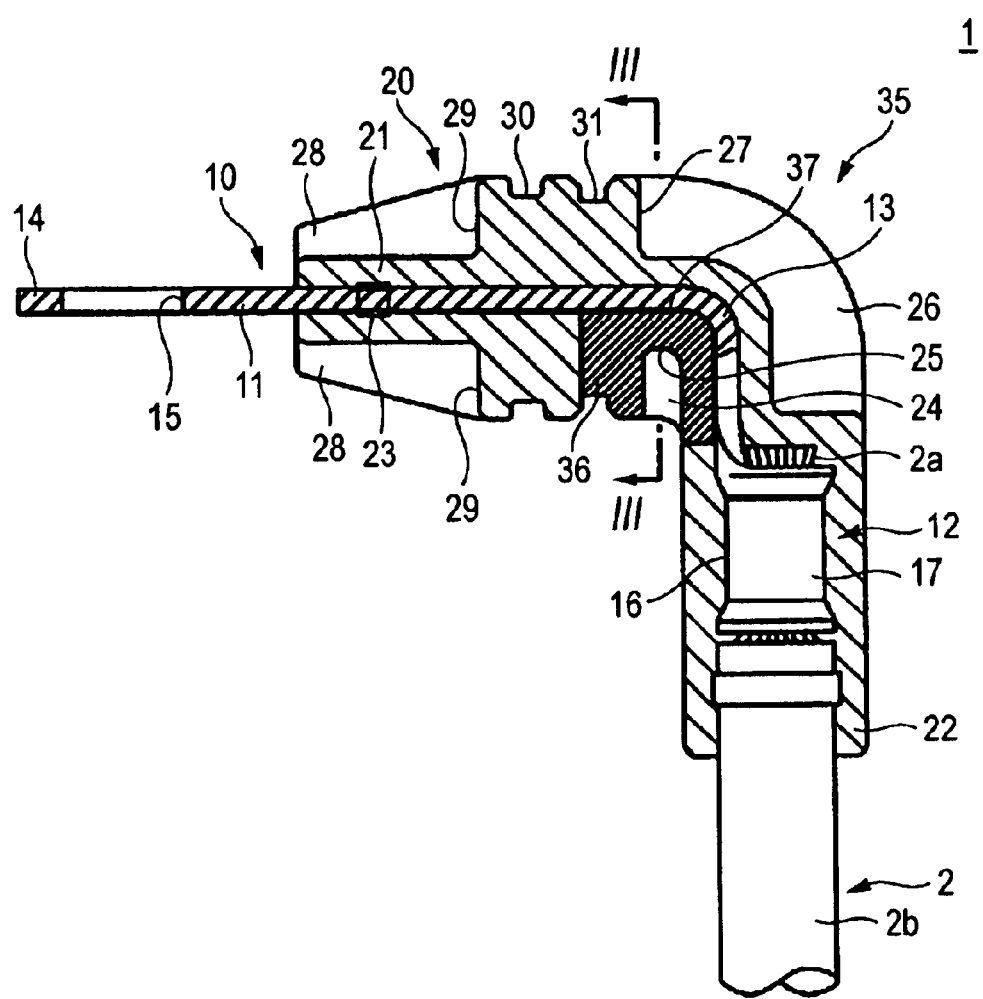
FIG. 1 is a section view of a connector according to an embodiment of the invention.
Figure 2:
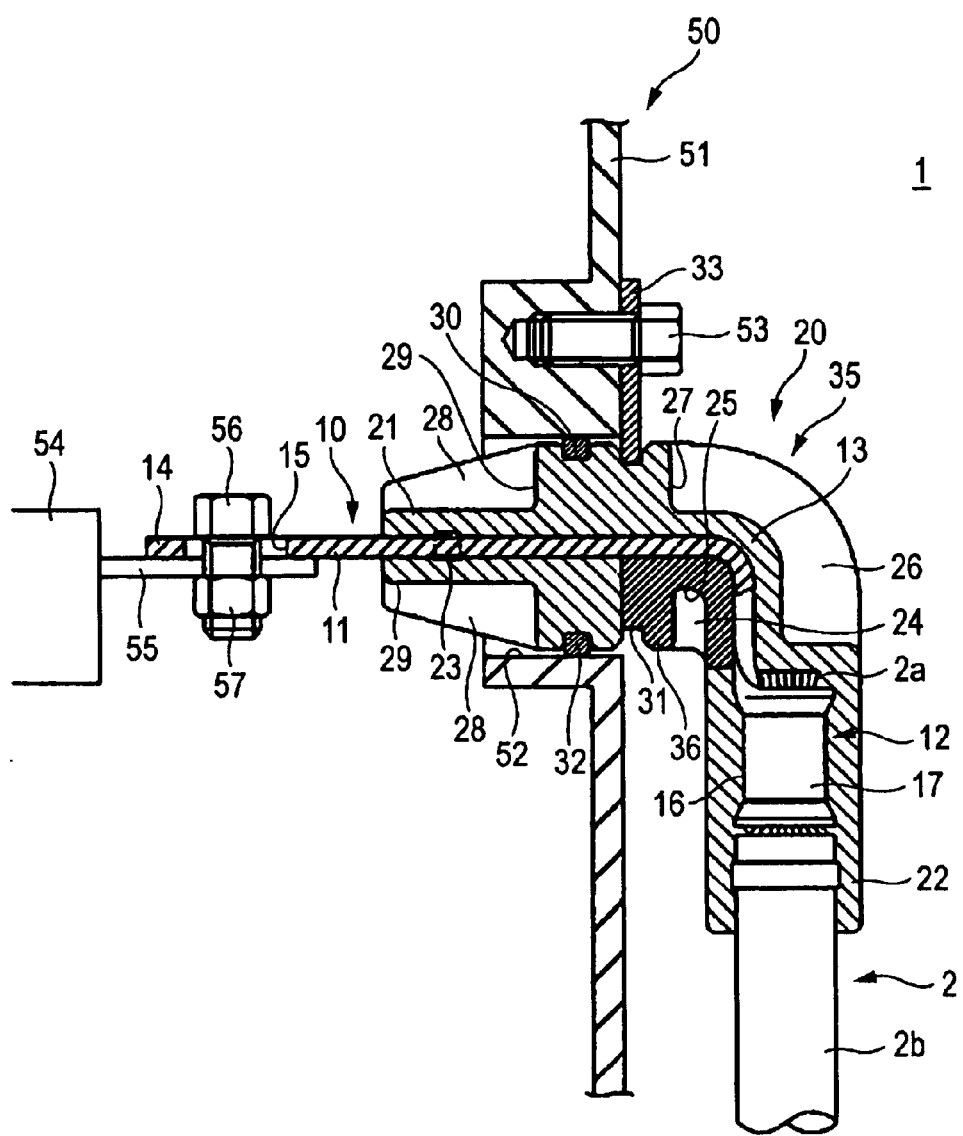
FIG. 2 is a section view showing a state where the connector is connected to a terminal of equipment.
Figure 3:
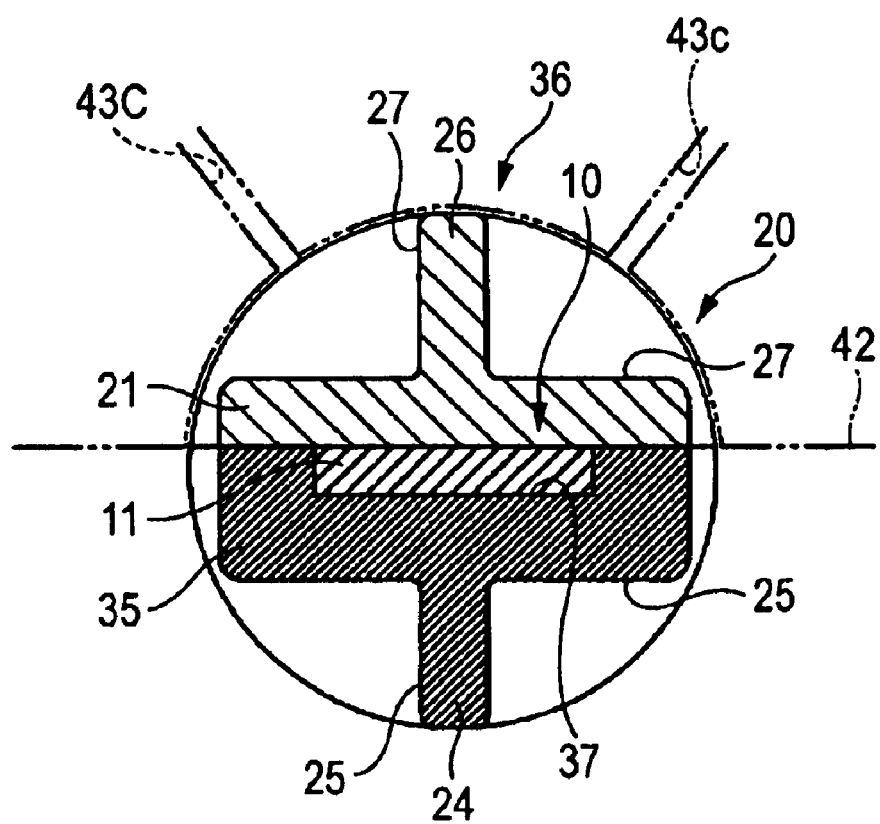
FIG. 3 is a section view taken along the line III—III of FIG. 1.

The connector 1 of the embodiment includes: a terminal fitting 10 which is secured to a terminal portion of an electric wire 2; and an outer covering 20 which is integrated with the terminal fitting 10 in a form where the outer covering 20 covers a part of the terminal fitting 10. In the following description, for the forward and rearward directions, the left side of FIG. 1 is set as the front side, and the upward and downward directions are referred with respect to those in FIG. 1.

The terminal fitting 10 is formed by applying a bending process on a metal plate which is previously stamped out into a predetermined shape. The terminal fitting 10 is configured by: a narrow flat plate portion 11 which linearly elongates in the forward and rearward directions while the plate face horizontally extends; a wire cramping portion 12 which downwardly extends substantially perpendicularly from the rear end of the flat plate portion 11; and a bent portion 13 through which the flat plate portion 11 and the wire cramping portion 12 are continuous with each other. The terminal fitting has a generally L-shape as viewed from a lateral side.

A front end portion of the flat plate portion 11 is formed as a connecting portion 14 which is to be connected to a terminal 55 of an equipment. An oblong bolt hole 15 which elongates in the forward and rearward directions is vertically opened in the connecting portion 14.

The wire cramping portion 12 is formed by: a vertical bottom plate 16 which is continuous substantially perpendicularly with the rear end of the flat plate portion 11; and a pair of cramp pieces 17 which rearwardly protrude from lateral side edges of the bottom plate 16, respectively. The wire cramping portion has a so-called open-barrel shape. A conductor 2a which is exposed by peeling an insulation cover 2b of the wire 2 is cramped to the wire cramping portion 12.

The outer covering 20 is molded with using a mold so as to be integrated with the generally L-shaped terminal fitting 10 which has undergone the step of cramping the wire 2. Namely, the outer covering 20 has a generally L-like shape so as to surround a substantially rear half of the flat plate portion 11 excluding the connecting portion 14 in the front end, the whole bent portion 13, the whole wire cramping portion 12, and terminal portions of the conductor 2a cramped to the wire cramping portion 12, and the insulation cover 2b. In the outer covering 20, the region surrounding the flat plate portion 11 is formed as a circular equipment fitting portion 21 in which a front end portion is tapered as a whole, and that surrounding the wire cramping portion 12 is formed as a wire surrounding portion 22 which has a generally circular shape as a whole.

The outer covering 20 is in close contact with the surface of the terminal fitting 10. Therefore, no liquid penetrates from the outside between the outer covering 20 and the terminal fitting 10. In the embodiment, in order to further enhance the sealing property, a sealing member 23 is attached before the molding process, to a position of the flat plate portion 11 which corresponds to the front end portion of the equipment fitting portion 21.

In the rear end portion of the equipment fitting portion 21 of the outer covering 20, a pair of slit-like lightening portions 25 are formed into a shape where the lower face side (the inner side of the bending) is cut away in a bilaterally symmetrical manner while leaving a rib 24. In addition, in a region corresponding to the continuous portion between the equipment fitting portion 21 and the wire surrounding portion 22, i.e., the region corresponding to the bent portion 13 of the terminal fitting 10, a pair of generally L-shaped lightening portions 27 are formed into a shape where the inner side of the bending are cut away in a bilaterally symmetrical manner while leaving a rib 26. In the front end portion of the equipment fitting portion 21, two pairs of lightening portions 29 are formed into a shape where the front end portion is cut away in a bilaterally symmetrical manner while leaving ribs 28. Since the lightening portions 25, 27, and 29 are disposed, it is possible to prevent a deformation which is called "sink mark", from occurring during the process of molding the outer covering 20.

In the outer periphery of the rear end portion of the equipment fitting portion 21, a seal groove 30 and a bracket groove 31 are formed so as to be juxtaposed in tandem. A seal ring 32 is fitted into the seal groove 30, and a bracket 33 is attached to the bracket groove 31.

The outer covering 20 is configured by integrating two parts of an outer covering body 35 and a reinforcement member 36 with each other in the molding process. All the portions other than the reinforcement member 36 constitute the outer covering body 35. In the embodiment, the outer covering body 35 and the reinforcement member 36 are made of the same synthetic resin material (i.e. nylon (registered trademark) including glass fiber).

The reinforcement member 36 occupies a lower half region in the rear end portion of the equipment fitting portion 21, and butts against the bent portion 13 of the terminal fitting 10 so as to support the portion from the inner side of the bending. The reinforcement member 36 has a generally semicircular shape. The arcuate lower face constitutes the surface of the lower face side of the equipment fitting portion 21. A lower half region of the bracket groove 31, the pair of lightening portions 25, and the rib 24 are formed in the lower face side of the reinforcement member 36. A recess 37 having a rectangular section shape which is opened to the upper face side and front and rear end face sides is formed in the upper face of the reinforcement member 36. The bottom face and right and left inner side faces of the recess 37 are in close contact (surface contact) with the lower face and left inner side faces of the rear end portion of the flat plate portion 11, respectively. The face of the bent portion 13 which is on the inner side of the bending is in close contact (surface contact) with a rear end portion of the recess 37 which is formed as a substantially arcuate face.

A die 40 which is used for molding the outer covering 20 is configured by a first die 41 which molds the inner side portions of the L-shape, and a second die 42 which molds the outer side portions. The first die 41 molds a substantially lower half region of the equipment fitting portion 21, and a substantially front half region of the wire surrounding portion 22, and the second die 42 molds a substantially upper half region of the equipment fitting portion 21, and a substantially rear half region of the wire surrounding portion 22. In the second die 42, three pairs of gates 43F, 43C, and 43R are disposed at three positions which are longitudinally arranged, respectively. The pair of front gates 43F inject a molten resin in an obliquely inward and downward direction at positions corresponding to the two lightening portions 29 on the side of the upper face of the equipment fitting portion 21. The pair of middle gates 43C injects a molten resin in an obliquely inward and downward direction at positions between the front end of the lightening portion 27 and the bracket groove 31 on the side of the upper face of the equipment fitting portion 21. The injection direction is set to the direction along which the rear end portion of the flat plate portion 11 is pressed against the upper face of the reinforcement member 36. Namely, the reinforcement member 36 is positioned to be opposed to the middle gates 43C across the rear end portion of the connecting portion 14 which is a portion of the terminal fitting 10 that is predicted to be deformed by the injection pressure, thereby supporting the terminal fitting 10. The pair of rear gates 43R inject a molten resin in an obliquely forward and inward direction at positions of the rear face of the wire surrounding portion 22.

Figure 4:
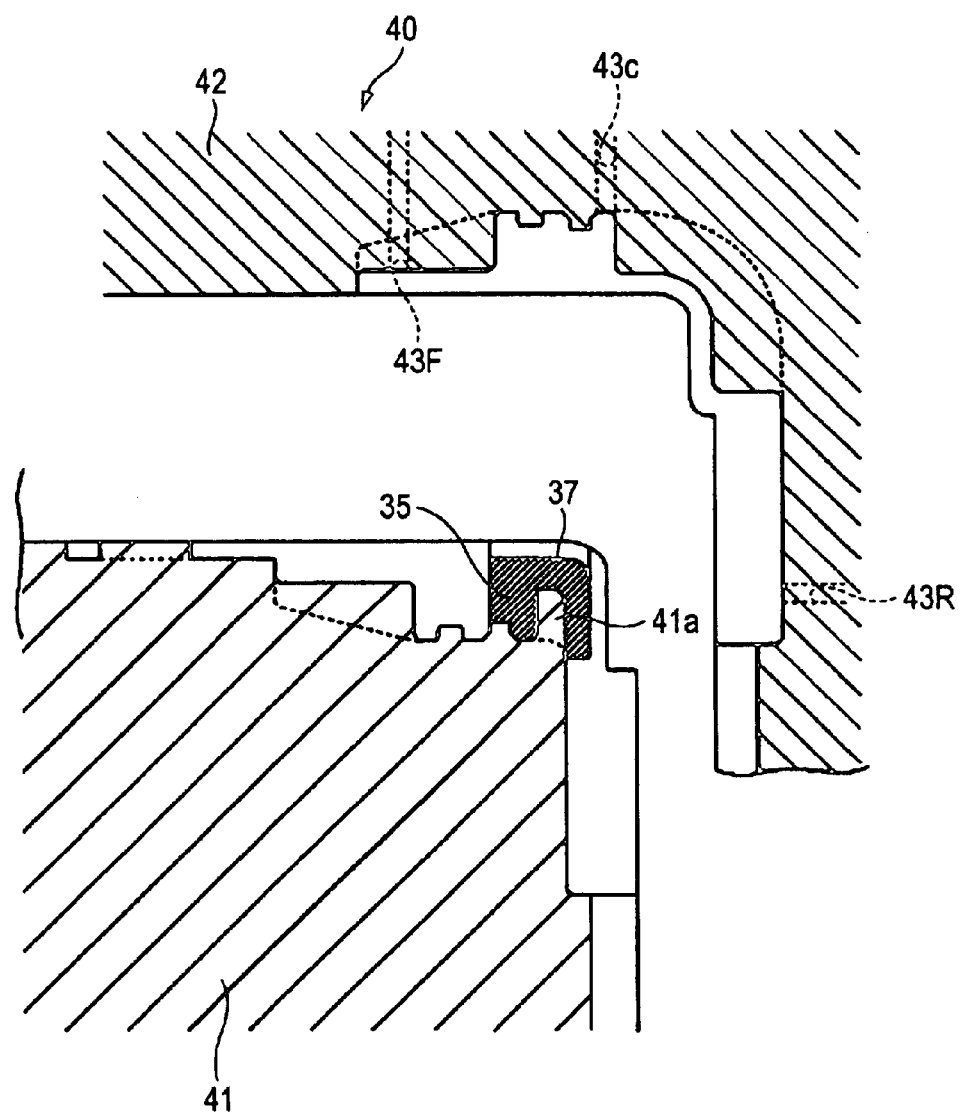
FIG. 4 is a section view showing a state where a reinforcement member is set in a mold.
Figure 5:
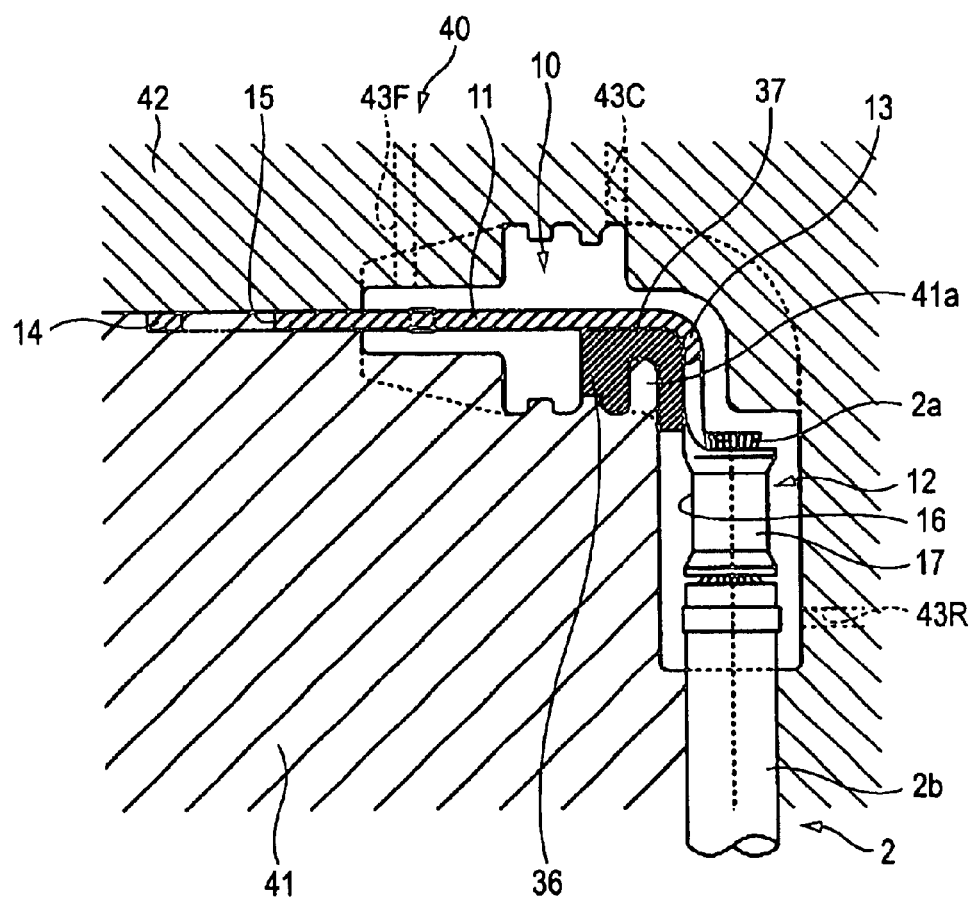
FIG. 5 is a section view showing a state where the reinforcement member and a terminal fitting are set in the mold.
Figure 6:
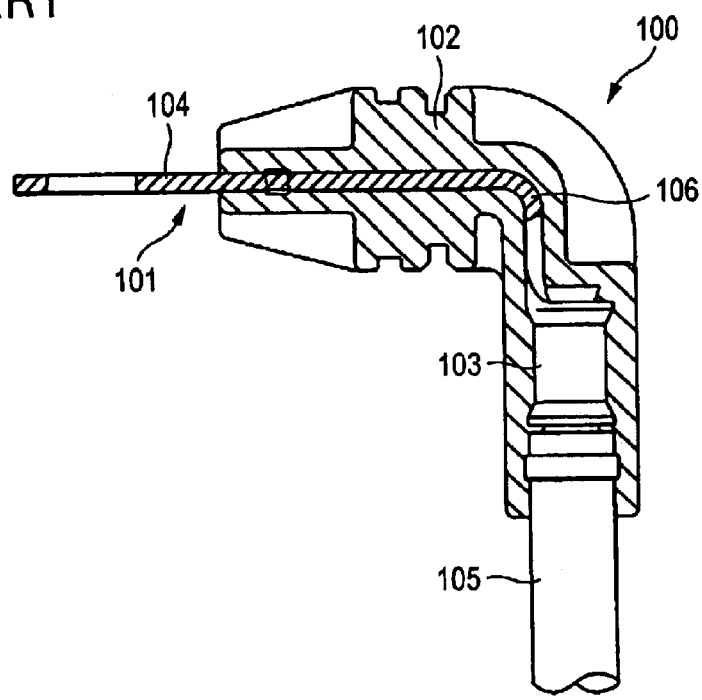
FIG. 6 is a section view of a conventional connector.
Figure 7:
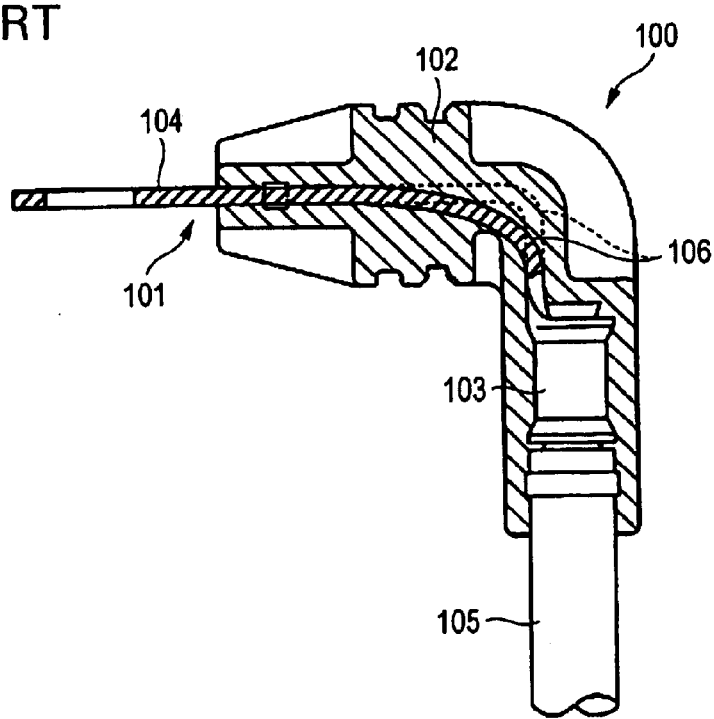
FIG. 7 is a section view showing a state where a terminal fitting is deformed in the conventional connector.

When the outer covering 20 is to be molded by molding, the reinforcement member 36 is set in the first die 41 in the mold opened state as shown in FIG. 4. At this time, the reinforcement member 36 is fitted onto a pair of projections 41a of the first die 41, the projections being used for forming the lightening portions 25 of the reinforcement member 36. Therefore, the reinforcement member 36 is positioned in the state where the reinforcement member is restricted from being idly moved with respect to the first die 41. As a result, even when the injection pressure acts on the reinforcement member 36, the reinforcement member 36 is not moved in the first die 41. A waterproof adhesive agent (not shown) is previously applied to the faces of the reinforcement member 36 which are to be in contact with the outer covering body 35, and then dried.

Thereafter, the terminal fitting 10 to which the wire 2 is previously cramped is set in the first die 41. In the set state, the lower face of the rear end portion of the flat plate portion 11, and the face of the bent portion 13 which is in the inner side of the bending are in surface contact with the recess 37 of the reinforcement member 36, to be supported from the inner side of the bending. Furthermore, the bolt hole 15 of the connecting portion 14 is fitted onto the first die 41, so that the front end portion of the flat plate portion 11 is positioned.

After the reinforcement member 36 and the terminal fitting 10 are set, the second die 42 is fitted onto the first die 41 to form a mold closed state, and a molten resin is injected at a high pressure into the die 40 from the gates 43F, 43C, and 43R. At this time, the lower face of the rear end portion of the flat plate portion 11, and the face of the bent portion 13 which is in the inner side of the bending are in surface contact with the recess 37 of the reinforcement member 36, to be supported from the inner side of the bending. Even when the rear end portion of the flat plate portion 11 and the bent portion 13 receive the injection pressure of the middle gates 43C from the obliquely upper side, therefore, the rear end portion and the bent portion are restricted from being downward displaced, and, even when the rear end portion and the bent portion receive the injection pressure of the rear gates 43R from the obliquely rearward side, they are restricted from being forward displaced. Furthermore, the rear end portion of the flat plate portion 11 is fitted into the recess 37 in a state where the rear end portion is restricted from being idly moved in the lateral directions. Even when the rear end portion of the flat plate portion 11 receives the injection pressure of the middle gates 43C from the obliquely upper lateral side, therefore, the rear end portion is restricted from being laterally displaced.

The connector 1 which is molded as described above is unloaded from the die 40 which is opened, and the bracket 33 is then attached to the bracket groove 31. The molded outer covering 20 is configured by the two parts or the outer covering body 35 and the reinforcement member 36. Since the adhesive agent is previously applied to the contact faces of the outer covering body 35 and the reinforcement member 36, there is no possibility that a liquid penetrates through a space between the reinforcement member 36 and the outer covering body 35.

The connector 1 is mounted onto an equipment 50 in the following manner. The equipment fitting portion 21 of the outer covering 20 is fitted into a mounting hole 52 formed in a case 51 of the equipment 50, and the bracket 33 is fixed to the outer face of the case 51 by a bolt 53, thereby mounting the connector 1 to the case 51. Next, in the case 51, the connecting portion 14 is conductively connected by a bolt 56 and a nut 57 to the equipment terminal 55 of an equipment body 54. In the mounted state, the space between the inner periphery of the mounting hole 52 and the outer periphery of the outer covering 20 is sealed by the seal ring 32, and the wire W which is downward led out from the lower end of the rear end portion of the outer covering 20 is laid along the outer face of the case 51.

As described above, in the embodiment, the outer covering 20 is configured by the outer covering body 35 which is made of a resin, and which is molded by molding, and the reinforcement member 36 which is previously molded, and which is the set in the die 40, and the reinforcement member 36 is placed at the position where displacement of the terminal fitting 10 is restricted against the injection pressure from the gates 43F, 43C, and 43R which acts on the terminal fitting 10 in the molding. Even when a high injection pressure acts on the terminal fitting 10 in the molding, therefore, deformation of the terminal fitting 10 due to the injection pressure can be surely prevented from occurring.

The reinforcement member 36 is exposed from the outer face of the outer covering 29. Hence, depending on the combination of the materials of the reinforcement member 36 and the outer covering body 35, there might become possible for water (moisture) to penetrate to the interior through the space between the outer covering body 35 and the reinforcement member 36. However, in the embodiment, the space between the outer covering body 35 and the reinforcement member 36 is sealed by the adhesive agent, and therefore it is possible to prevent such water penetration from occurring. That is, in the embodiment, the adhesive agent is used as a sealing member for sealing between the outer covering body 35 and the reinforcement member 26.

The invention is not limited to the embodiment which is described above and illustrated in the drawings. For example, the following embodiments also falls in the technical scope of the invention, and other various modifications can be made without departing form the spirit of the invention.

(1) In the embodiment, the wire is cramped to the rear end portion of the terminal fitting, and also the cramp portion is surrounded by the outer covering. In the invention, only the terminal fitting may be surrounded by the outer covering, and the wire cramping portion may be exposed to the outside of the outer covering.

(2) Although the embodiment in which the terminal fitting is connected by bolting to the counter terminal has been described, the invention can be applied also to a connector in which the terminal fitting is connected to the corresponding terminal of the equipment by fixing means other than bolting.

(3) In the embodiment, the reinforcement member is placed on the inner side of the bent portion of the terminal fitting. In the invention, one or more reinforcement member can be adequately placed in accordance with the portion of the terminal fitting on which the injection pressure acts and the direction of the pressure. Namely, the reinforcement member may be placed on the outer side of the bent portion in place of the inner side, or may be placed on both the inner and outer sides of the bent portion, or placed along the flat plate portion separated from the bent portion.

(4) In the embodiment, the single reinforcement member is used. However, in the invention, a plurality of reinforcement members may be used.

(5) In the embodiment, the reinforcement member is placed along only one face of the terminal fitting (the inside face of the bent portion). In the invention, the reinforcement member may be placed along both the inner and outer faces of the terminal fitting. In this case, the number of the reinforcement member can be set to one by forming the reinforcement member into a tubular shape so that the terminal fitting is fitted through the hollow space.

(6) In the embodiment, the outer covering body and the reinforcement member are made of the same material. However, in the invention, the material of the outer covering body may be different from that of the reinforcement member.

(7) In the embodiment, the reinforcement member butts against the terminal fitting in a surface contact state. However, in the invention, the reinforcement member may butt against the terminal fitting in a line contact state or a point state.

(8) In the embodiment, the reinforcement member butts against the terminal fitting in the mold. In the invention, in the mold, the reinforcement member and the terminal fitting may be in a non-contact state where a small gap is formed therebetween. In this case, even after the molding of the outer covering is completed, the non-contact state between the reinforcement member and the terminal fitting may be maintained, or the terminal fitting may be slightly deformed so as to butt against the reinforcement member, by the injection pressure in the molding of the outer covering.

According to the invention, the reinforcement member is placed at a position where displacement of the terminal fitting is restricted against an injection pressure of molding. Even when the injection pressure acts on the terminal fitting in the molding, therefore, deformation of the terminal fitting due to the injection pressure can be prevented from occurring.

Although the present invention has been shown and described with reference to a specific embodiment, various changes and modifications will be apparent to those skilled in the art from the teachings herein. Such changes and modifications as are obvious are deemed to come within the spirit, scope and contemplation of the invention as defined in the appended claims.

What is claimed is:

1. A connector comprising:

a single terminal fitting having a bent portion, bent substantially in a right angle, the terminal comprising a first leg and a second leg that join each other at the bent portion; and an outer covering configured to cover a part of the terminal fitting, the part including the bent portion, wherein the outer covering comprises:

an outer covering body made of resin; and a reinforcement member disposed at a position where restricting a deformation of the terminal fitting caused by an injection pressure acting thereon in molding the outer covering body, wherein the reinforcement member is disposed at a position adjacent to the bent portion, and the reinforcement member is disposed at a position of an inner side of the bending direction of the bent portion, and abuts both the first leg and the second leg.

2. The connector as claimed in claim 1, wherein the reinforcement member is made of the same material as that of the outer covering body.

3. The connector as claimed in claim 1, further comprising a sealing member configured to seal between the outer covering body and the reinforcement member.

4. The connector as claimed in claim 1, wherein the outer covering body and the reinforcement member are adhered with an adhesive agent.

5. The connector as claimed in claim 1, wherein the outer covering is configured to be in close contact with the surface of the terminal fitting.

* * * * *